United States Patent
Ren et al.

(10) Patent No.: US 12,255,837 B2
(45) Date of Patent: Mar. 18, 2025

(54) CONFIGURATION AND RESOURCE ALLOCATION FOR DOWNLINK DEMODULATION REFERENCE SIGNALS

(71) Applicant: Telefonaktiebolaget LM Ericsson (publ), Stockholm (SE)

(72) Inventors: Hong Ren, Kanata (CA); Chandra Sekhar Bontu, Nepean (CA); Mattias Frenne, Uppsala (SE); Jagadish Ghimire, Kanata (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 488 days.

(21) Appl. No.: 17/415,926

(22) PCT Filed: Dec. 26, 2018

(86) PCT No.: PCT/IB2018/060627
§ 371 (c)(1),
(2) Date: Jun. 18, 2021

(87) PCT Pub. No.: WO2020/136416
PCT Pub. Date: Jul. 2, 2020

(65) Prior Publication Data
US 2022/0085929 A1    Mar. 17, 2022

(51) Int. Cl.
H04L 5/00    (2006.01)
H04L 1/00    (2006.01)
(Continued)

(52) U.S. Cl.
CPC .......... *H04L 5/0016* (2013.01); *H04L 1/0027* (2013.01); *H04L 5/0051* (2013.01); *H04L 27/2613* (2013.01); *H04B 7/0452* (2013.01)

(58) Field of Classification Search
CPC ... H04L 5/0016; H04L 1/0027; H04L 5/0051; H04L 27/2613; H04B 7/0452
See application file for complete search history.

(56) References Cited

U.S. PATENT DOCUMENTS

2016/0088648 A1* 3/2016 Xue ...................... H04L 1/0026
                                                                370/252
2018/0035302 A1* 2/2018 Zhu .......................... H04L 1/06
(Continued)

FOREIGN PATENT DOCUMENTS

EP        3346747 A1 *  7/2018  ......... H04B 10/0773
WO   2013048401 A1     4/2013
WO   2018064313 A1     4/2018

OTHER PUBLICATIONS

International Search Report and Written Opinion dated Sep. 18, 2019 for International Application No. PCT/IB2018/060627 filed Dec. 26, 2018, consisting of 12-pages.
(Continued)

*Primary Examiner* — Steven Hieu D Nguyen
(74) *Attorney, Agent, or Firm* — Weisberg I.P. Law, P.A.

(57) ABSTRACT

According to one aspect, a network node is provided. The network node includes processing circuitry configured to allocate resources for a reference signal signaling for a first wireless device, the allocated resources configured to separate, in a slot, at least one transmission layer of the first wireless device from at least one transmission layers of a second wireless device by at least one of scheduling the first wireless device and second wireless device different reference signal ports that are separated by using the same resource elements and different CDM codes, scheduling the first wireless device and second wireless device at least one shared reference signal port using the same resource elements and CDM code, and scheduling the first wireless device and second wireless device on different reference signal ports that are separated by FDM using different resource elements and the same CDM codes.

16 Claims, 14 Drawing Sheets

(51) Int. Cl.
*H04L 27/26* (2006.01)
*H04B 7/0452* (2017.01)

(56) References Cited

U.S. PATENT DOCUMENTS

2018/0375551 A1* 12/2018 Song ................. H04W 72/1263
2020/0266946 A1* 8/2020 Kim ..................... H04L 27/261
2022/0116940 A1* 4/2022 Zhang .................. H04L 5/0048

OTHER PUBLICATIONS

3GPP TS 38.211 V15.2.0; 3rd Generation Partnership Project; Technical Specification Group Radio Access Network; NR; Physical channels and modulation (Release 15), Jun. 2018, consisting of 96-pages.
3GPP TS 38.212 V15.2.0; 3rd Generation Partnership Project; Technical Specification Group Radio Access Network; NR; Multiplexing and channel coding (Release 15), Jun. 2018, consisting of 98-pages.

* cited by examiner 1-symbol based      2-symbol based

Type 1

Type 2

CONFIGURATION AND RESOURCE ALLOCATION FOR DOWNLINK DEMODULATION REFERENCE SIGNALS

CROSS-REFERENCE TO RELATED APPLICATIONS

This application is a Submission Under 35 U.S.C. § 371 for U.S. National Stage Patent Application of International Application Number: PCT/IB2018/060627, filed Dec. 26, 2018 entitled "CONFIGURATION AND RESOURCE ALLOCATION FOR DOWNLINK DEMODULATION REFERENCE SIGNALS," the entirety of which is incorporated herein by reference.

TECHNICAL FIELD

Wireless communication and in particular, reference signal configuration and allocation.

BACKGROUND

5$^{th}$ Generation (5G) wireless communication technology, also referred to as New Radio (NR) technology, represents the next step in the wireless communication industry where NR related products are currently being developed worldwide.

In NR, the demodulation reference signal (DMRS) is used in both the downlink (DL) and the uplink (UL). The DMRS is used to help the wireless device or network node (e.g., gNB) decode the DL or UL traffic/control channels, respectively. The DMRS can be single-symbol or double-symbol based. For single-symbol based DMRS, the DMRS resource can be mapped to a single OFDM (Orthogonal Frequency Division Multiplexing) symbol or several (up to 4) separated OFDM symbols. For double-symbol based DMRS the minimum resource for DMRS consists of two consecutive OFDM symbols, and the total number of OFDM symbols for DMRS in a slot is either 2 or 4. FIG. 1 shows examples patterns for single-symbol based and double-symbol based DMRS configuration.

In the frequency domain, the 12 sub-carriers in an OFDM symbol are divided into 2 or 3 CDM (Code Division Multiplexing) groups. Type 1 DMRS has 2 CDM groups while type 2 DMRS has 3 CDM groups. In FIG. 2, the resource elements (REs) in the same hatchings style belong to the same CDM group.

Both type 1 and type 2 DMRS support multiple DMRS ports through FDM (Frequency Division Multiplexing) and CDM (Code Division Multiplexing). For single-symbol based, type 1 DMRS, the length-2 OCC (Orthogonal Cover Code, i.e., one example of a CDM code) is used in the frequency domain in each CDM group, so each CDM group can support 2 DMRS ports. With 2 CDM groups, the maximum number of 4 DMRS ports can be supported as illustrated in FIG. 3 that illustrates DMRS ports for type 1 DMRS where respective CDM groups are represented by respective hatching styles. Similarly, for double-symbol based, type 2 DMRS, the length-2 OCC is used in frequency and time domains in each CDM group, so each CDM group can support 4 DMRS ports. With 3 CDM groups and double-symbol based, the maximum number of 12 DMRS ports can be supported as illustrated in FIG. 4 that illustrates DMRS ports for type 2 DMRS where respective CDM groups are represented by respective hatching styles.

Both DL and UL DMRS are configured for each wireless device through RRC (Radio Resource Control) messages. For DL DMRS, DMRS type, the maximum number of OFDM symbols for DL front loaded DMRS (If the value is 1, only single-symbol based DMRS is used. If the value is 2, both single-symbol based DMRS and double-symbol based DMRS can be used depending on the scheduling control information), the presence of additional DMRS in a slot, and two scrambling initialization IDs (i.e., scrambling IDs) are configured by higher layer signalling, where each scrambling ID may correspond to one or multiple scrambling sequences. For a DMRS configuration, certain DMRS resources are allocated to a wireless device for a specific PDSCH (Physical Downlink Shared Channel) transmission to the wireless device. The DMRS resource allocation is informed to the wireless device through downlink control information (DCI) format 1_1, which carries information such as the number of DMRS CDM groups without data, DMRS ports, and the number of front loaded DMRS symbol (one or two). While the DMRS ports in the DCI format 1_1 are specific for the wireless device, the number of CDM groups and the number of front loaded DMRS symbols may not be specific for the wireless device.

A DMRS sequence may be generated using known techniques, for example according to the assigned DMRS ports and the configured higher-layer parameter scramblingID0 or scramblingID1 and mapped onto the DMRS resources. The assigned DMRS ports and the scrambling ID may set the initial state of shift registers in generating the Gold codes used in generating DMRS sequences.

When the network node transmits DL traffic to wireless devices, the transmission can be in the form of SU-MIMO (single-user multiple-input and multiple-output) or MU-MIMO (multi-user MIMO). For SU-MIMO, each DL PRB (Physical Resource Block) is used by a single wireless device. If the rank is greater than 1, the multiple layers for the wireless device may be separated by orthogonal DMRS ports. Thus, the wireless device can identify the DMRS for each layer and perform DL channel estimation accordingly. For MU-MIMO, each DL PRB (Physical Resource Block) can be shared by multiple wireless devices at the same time. Now the transmission layers can be separated by orthogonal DMRS ports and non-orthogonal scrambling initialization IDs. Similar to SU-MIMO, each wireless device identifies the DMRS for all layers belonging to it and perform DL channel estimation accordingly.

As previously described, two DMRS scrambling initialization IDs can be configured for each wireless device. For each PDSCH transmission for the wireless device, the network node determines which ID(s) may be included in the Downlink Control Information (DCI). In every DL TTI, the network node determines which DMRS port(s) may be allocated for a wireless device irrespective if SU-MIMO or MU-MIMO is being implemented.

The algorithms that determine the scrambling initialization IDs to be configured for a wireless device and determine which DMRS port(s) and scrambling initialization ID(s) to be allocated for a wireless device can impact the network performance, which can be illustrated by the following examples:

Example 1: A wireless device is configured with type 1, single-symbol based DL DMRS. For a SU-MIMO PDSCH transmission with rank of 2, the network node may need to assign two DMRS ports for the wireless device. If ports (1000, 1001) are allocated for the wireless device, this allocation can result in degraded channel estimation performance compared to the allocation of ports (1000, 1002) since the CDM separated ports (1000, 1001) may lead to larger channel estimation error compared to FDM separated ports (1000, 1002). On the other hand, ports (1000,1002) has double RS overhead compared to using ports (1000,1001).

Example 2: Considering a MU-MIMO transmission where all the co-scheduled wireless devices are configured with the same scrambling initialization IDs. It is assumed that all wireless devices are configured with type 1, double-symbol based DL DMRS. In this case, there are up to 8 different DMRS ports. If all MU-MIMO layers are separated by orthogonal DMRS ports only (same scrambling ID for all ports in the same CDM group), the max number of MU-MIMO layers is limited to 8. If the network node decides to use scrambling initialization ID to separate DMRS (using pseudo orthogonal separation) and randomly selects two wireless devices to share the same DMRS port(s), the DL channel estimation performance can be quite poor if the two wireless devices are not well separated spatially. Even if the network node tries to make the spatially well separated wireless devices to share the same DMRS port(s), those wireless devices may not have different scrambling initialization IDs to use due to bad scrambling initialization ID configuration.

Hence, one issue with existing systems relates to the scheduler at the network node and how the scheduler assigns these ports and scrambling IDs (i.e., the use of orthogonal ports or pseudo orthogonal ports respectively) to attempt to maximize the wireless device throughput and/or the network performance (such as the total throughput across all scheduled wireless devices) which is related to the total number of transmitted layers in a slot. Another issue in existing systems relates to how to maximize the channel estimation performance using this port and scrambling ID selection.

SUMMARY

The instant disclosure solves at least a portion of at least one problem associated with existing systems by providing a DL DMRS configuration and resource allocation that may enable wireless devices to obtain better downlink channel estimation than, for example, existing systems, and may allow more layers to be supported for DL MU-MIMO. This may help achieve better downlink throughput.

Some embodiments advantageously provide a method, network node, wireless device and system for reference signal configuration and allocation.

According to one aspect of the disclosure, a network node is provided. The network node includes processing circuitry configured to: allocate resources for a reference signal signaling for a first wireless device, the allocated resources configured to separate, in a slot, at least one transmission layer of the first wireless device from at least one transmission layers of a second wireless device by at least one of: scheduling the first wireless device and second wireless device different reference signal ports that are separated by using the same resource elements and different code division multiplexing, CDM, codes, the first wireless device and second wireless device having associated scrambling sequences, scheduling the first wireless device and second wireless device at least one shared reference signal port using the same resource elements and CDM code, the first wireless device and second wireless device having different scrambling sequences, scheduling the first wireless device and second wireless device on different reference signal ports that are separated by frequency division multiplexing, FDM, using different resource elements and the same CDM codes, the first and second wireless device having associated scrambling sequences, and scheduling the first wireless device and second wireless device on different reference signal ports that are separated through both FDM and CDM by using different resource elements and different CDM codes, the first wireless device and second wireless device having associated scrambling sequences.

According to one embodiment of this aspect, the first wireless device and the second wireless device having the at least one shared reference signal port are part of a wireless device sub-group, the wireless device sub-group meeting at least one predefined spatial condition. According to one embodiment of this aspect, at least one predefined spatial condition includes a spatial metric associated with each wireless device within the subgroup that meets a predefined criterion with respect to all other wireless devices in the same subgroup. According to one embodiment of this aspect, the spatial metric is a measure of an angle of arrival, AoA, (or equivalently, angle of departure AoD) between a wireless device and a plane of an antenna array of the network node.

According to one embodiment of this aspect, the spatial metric is a measure, possibly a real or complex valued scalar, or a complex valued vector or matrix, of spatial channel—from the transmitter antennas of the network node to the receiver antennas of a wireless device within a subgroup with respect to the network node. According to one embodiment of this aspect, the predefined criterion is associated with a difference of spatial metrics between two wireless devices that is greater than a predefined threshold. According to one embodiment of this aspect, the predefined criterion is associated with an absolute value of an inner product of the normalized spatial metrics of any two wireless devices that is less than a predefined threshold.

According to one embodiment of this aspect, the allocated resources provide for multi-user multiple-input multiple-output, MU-MIMO, transmission. According to one embodiment of this aspect, the reference signal ports corresponds to a rank of the transmission to a first wireless device. According to one embodiment of this aspect, the processing circuitry is further configured to determine a number of physical resource blocks, PRBs, allocated to the first wireless device, the scheduling of the at least one shared reference port to the first wireless device and second wireless device being based on the determined number of PRBs. According to one embodiment of this aspect, the first wireless device is scheduled for a reference signal port combination for one selected from a group consisting of: a one front-load reference signal symbol configuration; and a two front-load reference signal symbol configuration. According to one embodiment of this aspect, the processing circuitry is further configured to: allocate resources for reference signal signaling for a plurality of wireless devices including the first wireless device, the allocated resources configured to separate, in a slot, at least one transmission layer of each of the plurality of wireless devices from each other, respectively.

According to another aspect of the disclosure, a method for a network node is provided. Resources for a reference signal signaling for a first wireless device are allocated. The allocated resources configured to separate, in a slot, at least one transmission layer of the first wireless device from at least one transmission layers of a second wireless device by at least one of: scheduling the first wireless device and second wireless device different reference signal ports that are separated by using the same resource elements and different code division multiplexing, CDM, codes, the first wireless device and second wireless device having associated scrambling sequences, scheduling the first wireless device and second wireless device at least one shared reference signal port using the same resource elements and CDM code, the first wireless device and second wireless device having different scrambling sequences, scheduling the first wireless device and second wireless device on different reference signal ports that are separated by frequency division multiplexing, FDM, by using different resource elements and the same CDM codes, the first and second wireless device having associated scrambling sequences, and scheduling the first wireless device and second wireless device on different reference signal ports that are separated through both FDM and CDM by using different resource elements and different CDM codes, the first wireless device and second wireless device having associated scrambling sequences.

According to one embodiment of this aspect, the first wireless device and the second wireless device having the at least one shared reference signal port are part of a wireless device sub-group, the wireless device sub-group meeting at least one predefined spatial condition. According to one embodiment of this aspect, at least one predefined spatial condition includes a spatial metric associated with each wireless device within the subgroup that meets a predefined criterion with respect to all other wireless devices in the same subgroup. According to one embodiment of this aspect, the spatial metric is a measure or estimate of an angle of arrival, AoA, between a wireless device and a plane of an antenna array of the network node. According to one embodiment of this aspect, the spatial metric is a measure of spatial channel of a wireless device within a subgroup with respect to the network node.

According to one embodiment of this aspect, the predefined criterion is associated with a difference of spatial metrics between two wireless devices that is greater than a predefined threshold. According to one embodiment of this aspect, the predefined criterion is associated with an absolute value of an inner product of the normalized spatial metrics of any two wireless devices that is less than a predefined threshold. According to one embodiment of this aspect, the allocated resources provide for multi-user multiple-input multiple-output, MU-MIMO, transmission. According to one embodiment of this aspect, the reference signal ports corresponds to a rank of the transmission to the first wireless device.

According to one embodiment of this aspect, a number of physical resource blocks, PRBs, allocated to the first wireless device are determined where the scheduling of the at least one shared reference port to the first wireless device and second wireless device being based on the determined number of PRBs. According to one embodiment of this aspect, the first wireless device is scheduled for a reference signal port combination for one selected from a group consisting of: a one front-load reference signal symbol configuration; and a two front-load reference signal symbol configuration. According to one embodiment of this aspect, resources for reference signal signaling for a plurality of wireless devices including the first wireless device are allocated where the allocated resources configured to separate, in a slot, at least one transmission layer of each of the plurality of wireless devices from each other, respectively.

According to another aspect of the disclosure, a network node is provided. The network node includes processing circuitry configured to: allocate resources for demodulation reference signal, DMRS, signaling for a first wireless device, the allocated resources configured to separate, in a slot, at least one transmission layer of the first wireless device from at least one transmission layers of a second wireless device by at least one of: scheduling the first wireless device and second wireless device different DMRS ports that are separated by using the same resource elements and different code division multiplexing, CDM, codes, the first wireless device and second wireless device having associated scrambling sequences, scheduling the first wireless device and second wireless device at least one shared DMRS port using the same resource elements and CDM code, the first wireless device and second wireless device having different scrambling sequences, scheduling the first wireless device and second wireless device on different DMRS ports that are separated by frequency division multiplexing, FDM, by using different resource elements and the same CDM codes, the first and second wireless device having associated scrambling sequences; and scheduling the first wireless device and second wireless device on different DMRS ports that are separated through both FDM and CDM by using different resource elements and different CDM codes, the first wireless device and second wireless device having associated scrambling sequences. The processing circuitry being further configured to participate in one selected from a group consisting of single-user multiple-input multiple-output, SU-MIMO, and multi-user-MIMO, MU-MIMO, based at least in part on the allocated resources for DMRS signaling.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
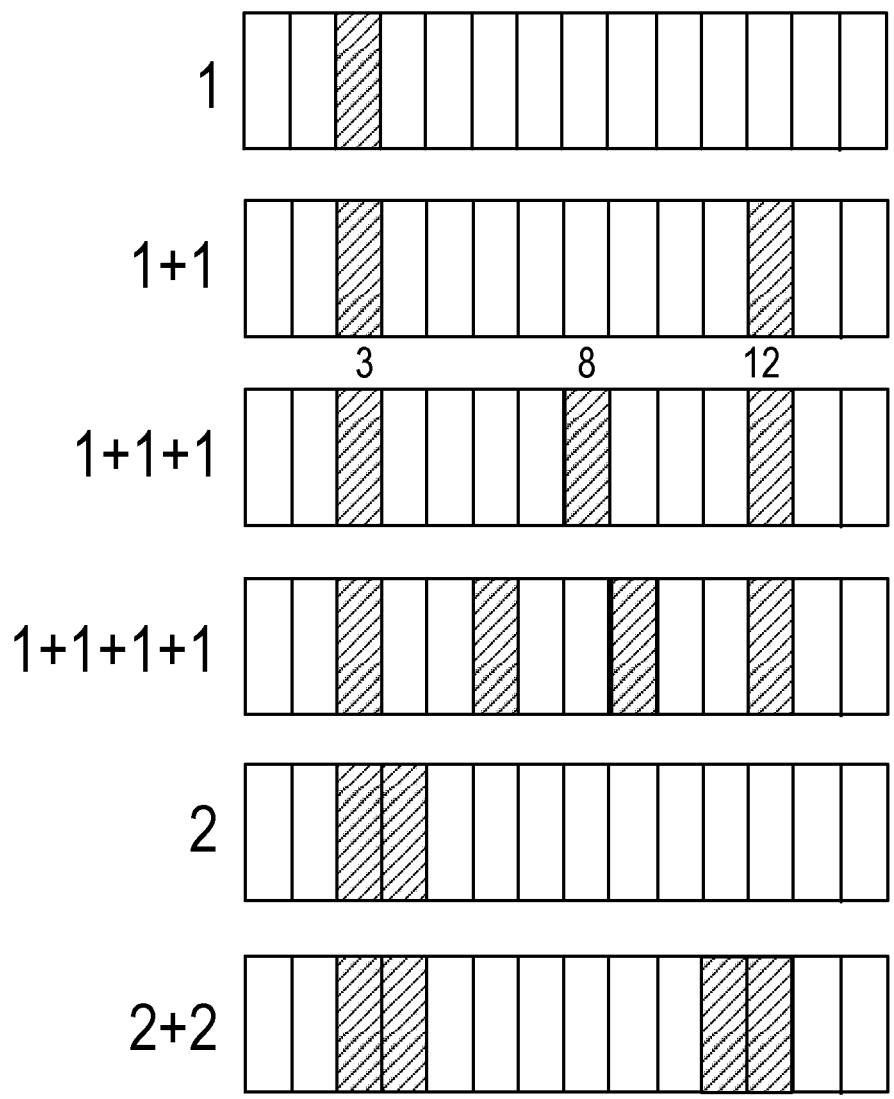
FIG. 1 is a diagram of a DMRS patterns for single symbol DMRS and double symbol DMRS.
Figure 2:
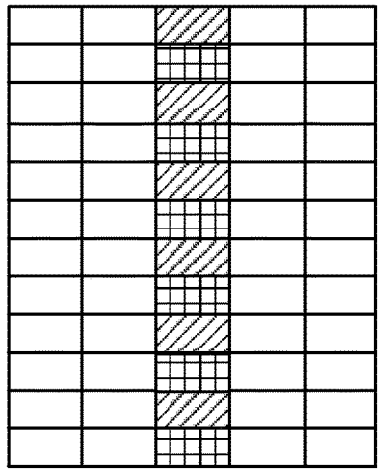
FIG. 2 is a diagram of type 1 and type 2 DMRS.
Figure 2:
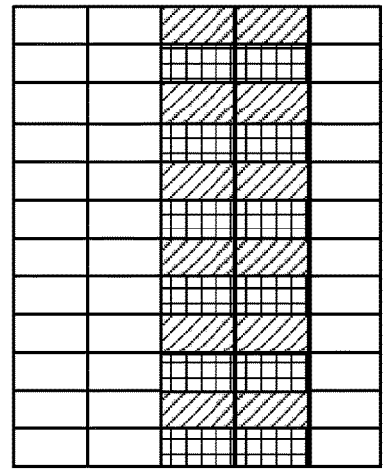
Figure 2:
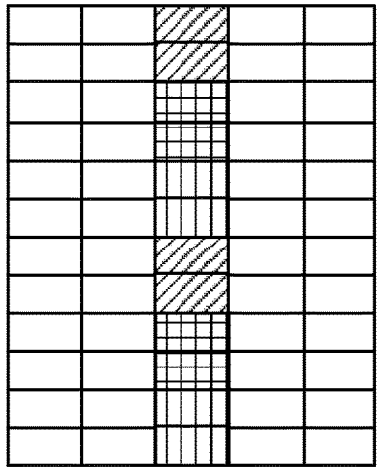
Figure 2:
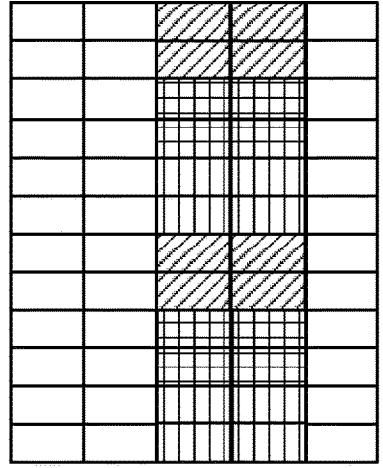
Figure 3:
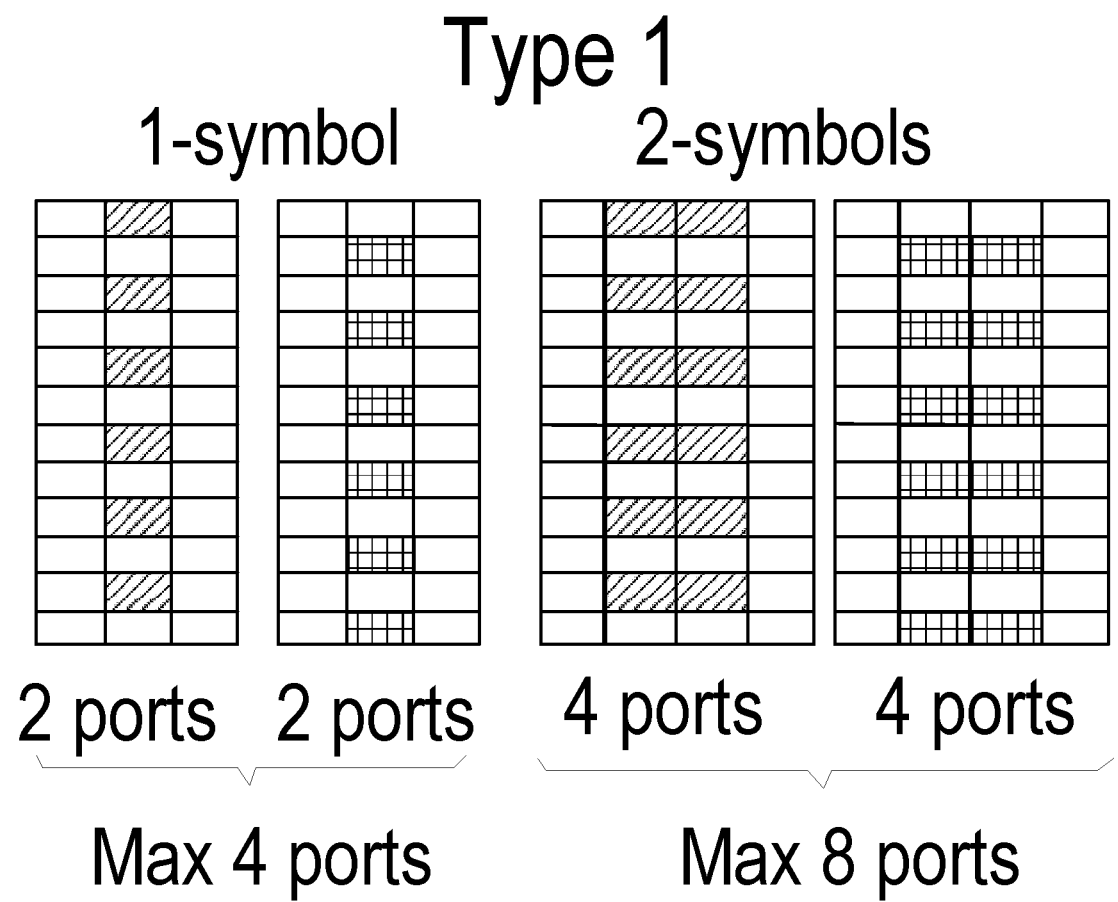
FIG. 3 is a diagram for DMRS ports for type 1 DMRS.
Figure 4:
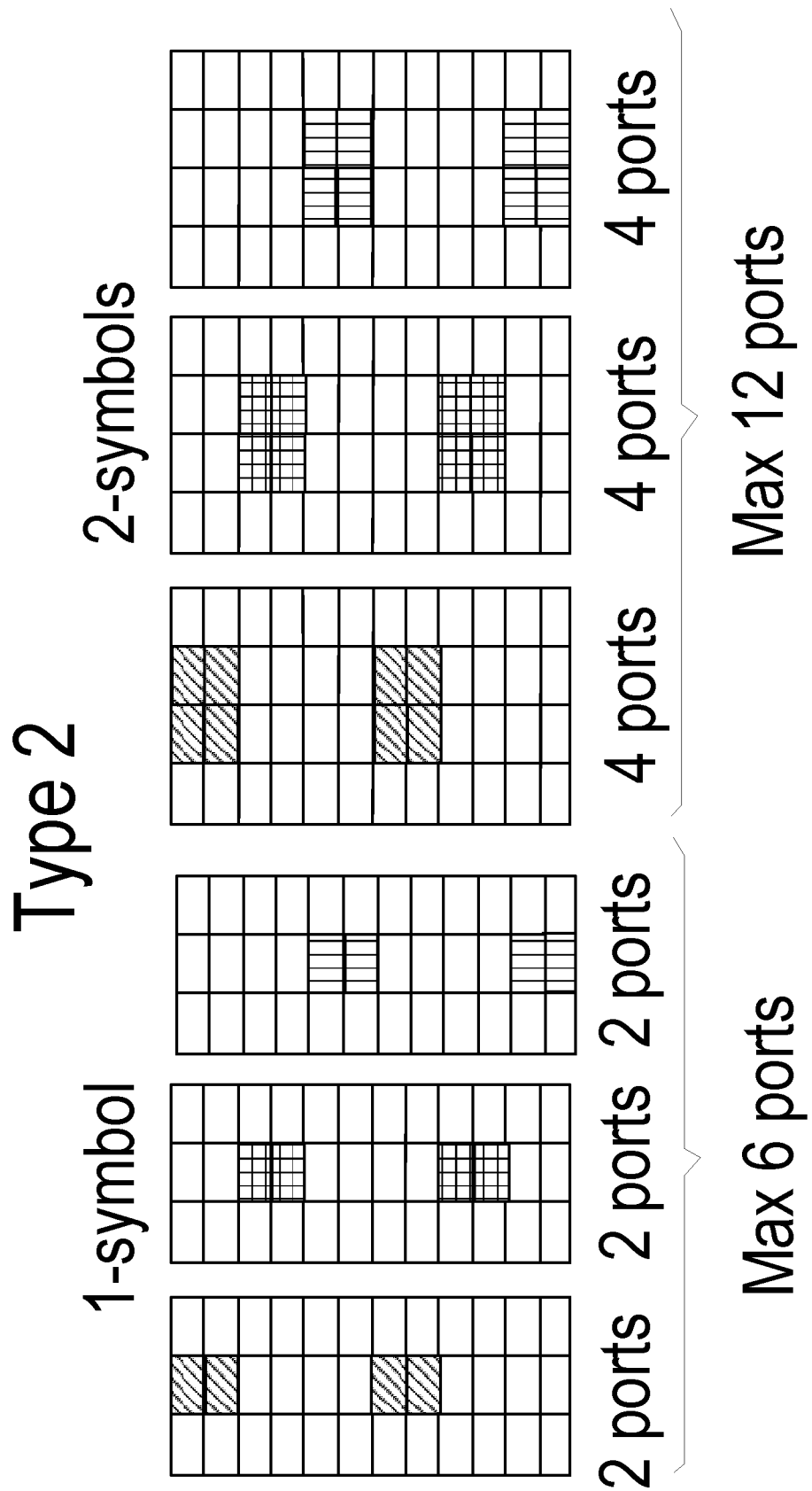
FIG. 4 is a diagram for DMRS ports for type 2 DMRS.

Before describing in detail exemplary embodiments, it is noted that the embodiments reside primarily in combinations of apparatus components and processing steps related to reference signal configuration and allocation. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments, the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

The term signal used herein can be any physical signal or physical channel. Examples of downlink physical signals are reference signal such as Primary Synchronization Signal (PSS), Secondary Synchronization Signal (SSS), Cell Specific Reference Signal (CRS), Positioning Reference Signal (PRS), Channel State Information Reference Signal (CSI-RS), Demodulation Reference Signal (DMRS), Narrowband Reference Signal (NRS), Narrowband Primary Synchronization Signal (NPSS), Narrowband Secondary Synchronization Signal (NSSS), Synchronization Signals (SS), Multimedia Broadcast Single Frequency Reference Signal (MBSFN RS) etc. Examples of uplink physical signals are reference signal such as Sounding Reference Signal (SRS), DMRS, etc. The term physical channel (e.g., in the context of channel reception) used herein is also called as 'channel. The physical channel carries higher layer information (e.g. RRC, logical control channel, etc.). Examples of downlink physical channels are Physical Broadcast Channel (PBCH), Narrowband Physical Broadcast Channel (NPBCH), Physical Downlink Control Channel (PDCCH), Physical Downlink Shared Channel (PDSCH), short Physical Downlink Shared Channel (sPDSCH), Machine Type Communication (MTC) physical downlink control channel (MPDCCH), Narrowband Physical Downlink Control Channel (NPDCCH), Narrow Physical Downlink Shared Channel NPDSCH, Enhanced Physical Downlink Control Channel (E-PDCCH), etc. Examples of uplink physical channels are shorten Physical Uplink Control Channel (sPUCCH). shorten Physical Uplink Shared Channel (sPUSCH), Physical Uplink Shared Channel (PUSCH), Physical Uplink Control Channel (PUCCH), Narrowband Physical Uplink Shared Channel (NPUSCH), Physical Random Access Channel (PRACH), Narrowband Physical Random Access Channel (NPRACH), etc.

The term resource and/or resource element used herein may correspond to any type of physical resource or radio resource expressed in terms of length of time and/or frequency. Signals are transmitted or received by a radio node over a time resource. Examples of time resources are: symbol, time slot, subframe, radio frame, Transmission Time Interval (TTI), interleaving time, etc.

The term time resource used herein may correspond to any type of physical resource or radio resource expressed in terms of length of time. Examples of time resources are: symbol, time slot, subframe, radio frame, TTI, interleaving time, etc.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

A cell may be generally a communication cell, e.g., of a cellular or mobile communication network, provided by a node. A serving cell may be a cell on or via which a network node (the node providing or associated to the cell, e.g., base station, gNB or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard. One or more carriers (e.g., uplink and/or downlink carrier/s and/or a carrier for both uplink and downlink) may be associated with a cell.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. wireless device) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. wireless device) may comprise configuring the wireless device to perform certain measurements on certain subframes or radio resources and reporting such measurements according to embodiments of the present disclosure.

Data may refer to any kind of data, in particular, any one of and/or any combination of control data or user data or payload data. Control information (which may also be referred to as control data) may refer to data controlling and/or scheduling and/or pertaining to the process of data transmission and/or the network or terminal operation.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular, a base station, gNB or eNodeB. An uplink direction may refer to a data transfer direction from a terminal to a network node, e.g., base station, gNB and/or relay station. A downlink direction may refer to a data transfer direction from a network node, e.g., base station, gNB and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station, gNB or eNodeB, may be adapted to provide and/or define and/or control one or more cells.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 5:
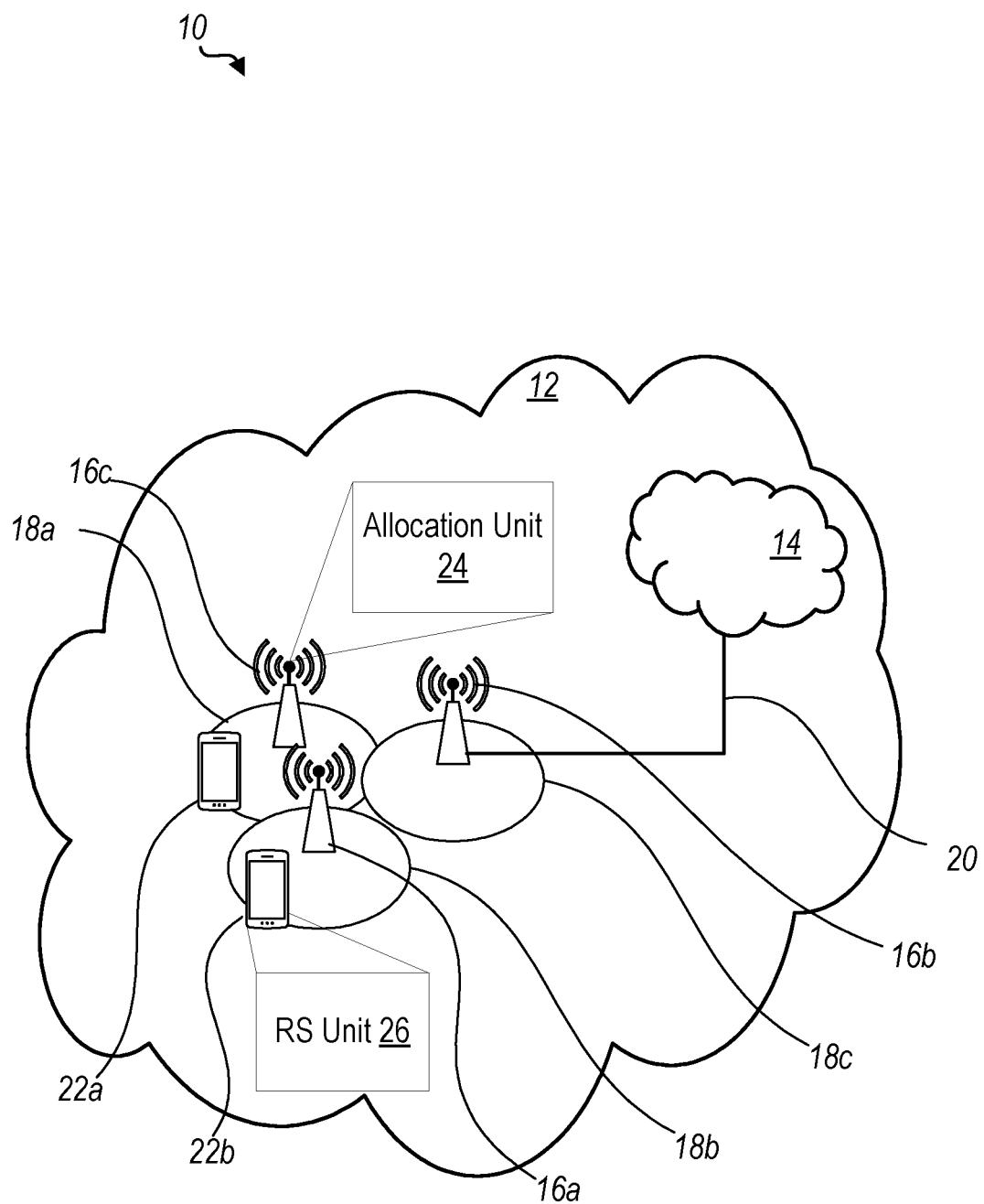
FIG. 5 is a schematic diagram of an exemplary network architecture illustrating a communication system according to the principles in the present disclosure.

Referring again to the drawing figures, in which like elements are referred to by like reference numerals, there is shown in FIG. 5 a schematic diagram of a communication system 10, according to an embodiment, such as a 3GPP-type cellular network that may support standards such as LTE and/or NR (5G), which includes an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 is configured to include allocation unit 24 for performing one or more network node 16 functions described herein. A wireless device 22 is configured to include a reference signal (RS) unit 26 for performing one or more wireless device 22 functions described herein.

Example implementations, in accordance with an embodiment, of the WD 22 and network node 16 discussed in the preceding paragraphs will now be described with reference to FIG. 6. The communication system 10 includes a network node 16 provided in a communication system 10 and including hardware 28 enabling it to communicate with one or more other network nodes 16 and/or with the WD 22. The hardware 28 may include a communication interface 30 for setting up and maintaining a wired or wireless connection with an interface of a different communication device of the communication system 10, as well as a radio interface 32 for setting up and maintaining at least a wireless connection 34 with a WD 22 located in a coverage area 18 served by the network node 16. The radio interface 32 may be formed as or may include, for example, one or more RF transmitters, one or more RF receivers, and/or one or more RF transceivers.

In the embodiment shown, the hardware 28 of the network node 16 further includes processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from) the memory 40, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 42 stored internally in, for example, memory 40, or stored in external memory (e.g., database, storage array, network storage device, etc.) accessible by the network node 16 via an external connection. The software 42 may be executable by the processing circuitry 36. The processing circuitry 36 may be configured to control any of the methods and/or processes described herein and/or to cause such methods, and/or processes to be performed, e.g., by network node 16. Processor 38 corresponds to one or more processors 38 for performing network node 16 functions described herein. The memory 40 is configured to store data, programmatic software code and/or other information described herein. In some embodiments, the software 42 may include instructions that, when executed by the processor 38 and/or processing circuitry 36, causes the processor 38 and/or processing circuitry 36 to perform the processes described herein with respect to network node 16. For example, processing circuitry 36 of the network node 16 may include allocation unit 24 configured to allocate resources as described herein.

The communication system 10 further includes the WD 22 already referred to. The WD 22 may have hardware 43 that may include a radio interface 44 configured to set up and maintain a wireless connection 34 with a network node 16 serving a coverage area 18 in which the WD 22 is currently located. The radio interface 44 may be formed as or may include, for example, one or more RF transmitters, one or more RF receivers, and/or one or more RF transceivers.

The hardware 43 of the WD 22 further includes processing circuitry 46. The processing circuitry 46 may include a processor 48 and memory 50. In particular, in addition to or instead of a processor, such as a central processing unit, and memory, the processing circuitry 46 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 48 may be configured to access (e.g., write to and/or read from) memory 50, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 52, which is stored in, for example, memory 50 at the WD 22, or stored in external memory (e.g., database, storage array, network storage device, etc.) accessible by the WD 22. The software 52 may be executable by the processing circuitry 46. The software 52 may include a client application 54. The client application 54 may be configured to provide a service to a human or non-human user via the WD 22. The client application 54 may interact with the user to generate the user data that it provides.

The processing circuitry 46 may be configured to control any of the methods and/or processes described herein and/or to cause such methods, and/or processes to be performed, e.g., by WD 22. The processor 48 corresponds to one or more processors 48 for performing WD 22 functions described herein. The WD 22 includes memory 50 that is configured to store data, programmatic software code and/or other information described herein. In some embodiments, the software 52 and/or the client application 54 may include instructions that, when executed by the processor 48 and/or processing circuitry 46, causes the processor 48 and/or processing circuitry 46 to perform the processes described herein with respect to WD 22. For example, the processing circuitry 46 of the wireless device 22 may include a reference signal (RS) unit 26 configured to transmit and/or received a reference signal on allocated resources as described herein.

Figure 6:
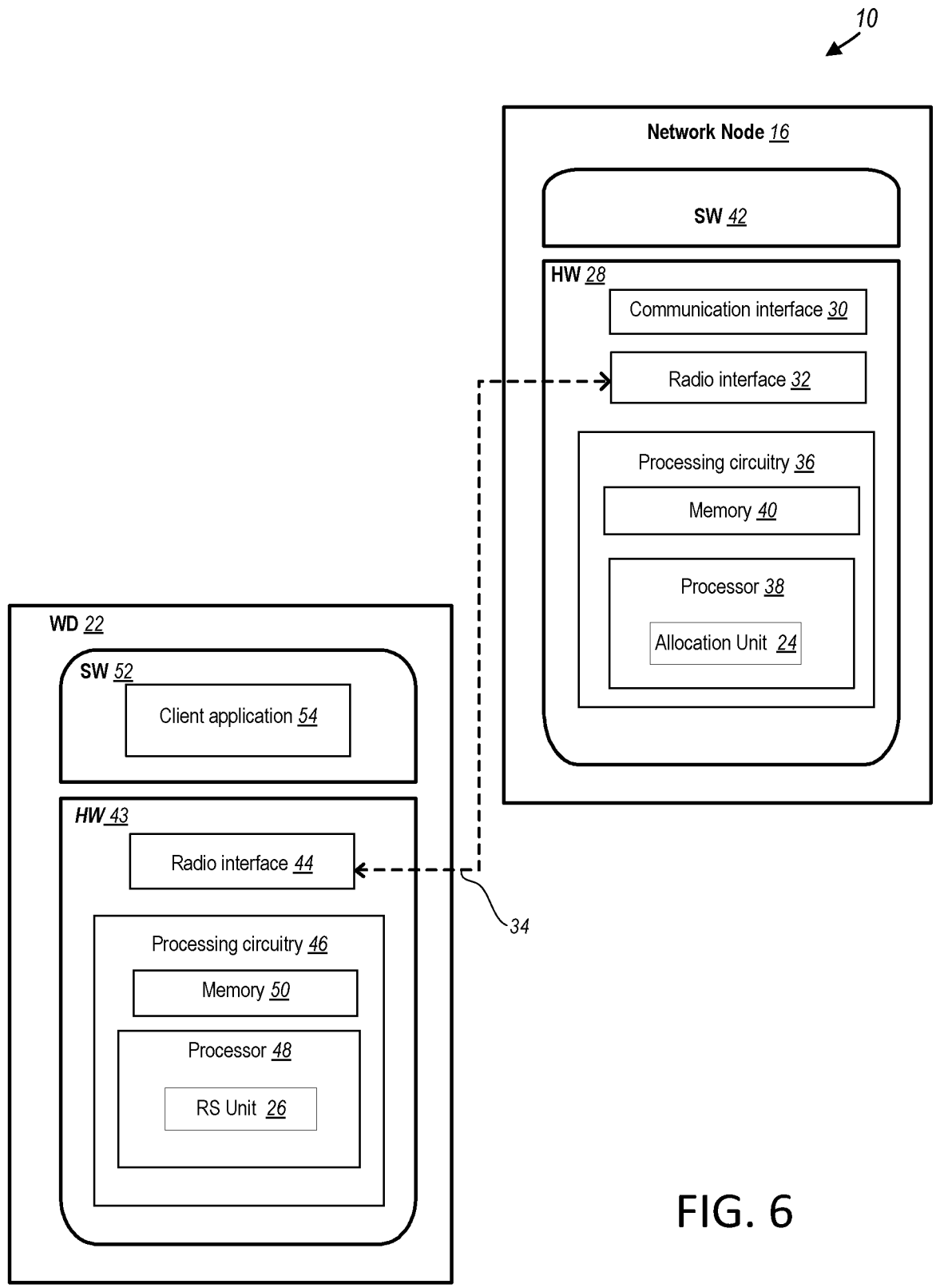
FIG. 6 is a block diagram of a wireless device and network node according to some embodiments of the present disclosure.

In some embodiments, the inner workings of the network node 16 and WD 22 may be as shown in FIG. 6 and independently, the surrounding network topology may be that of FIG. 5.

Although FIGS. 5 and 6 show various "units" such as RS unit 26 and allocation unit 24 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 7:
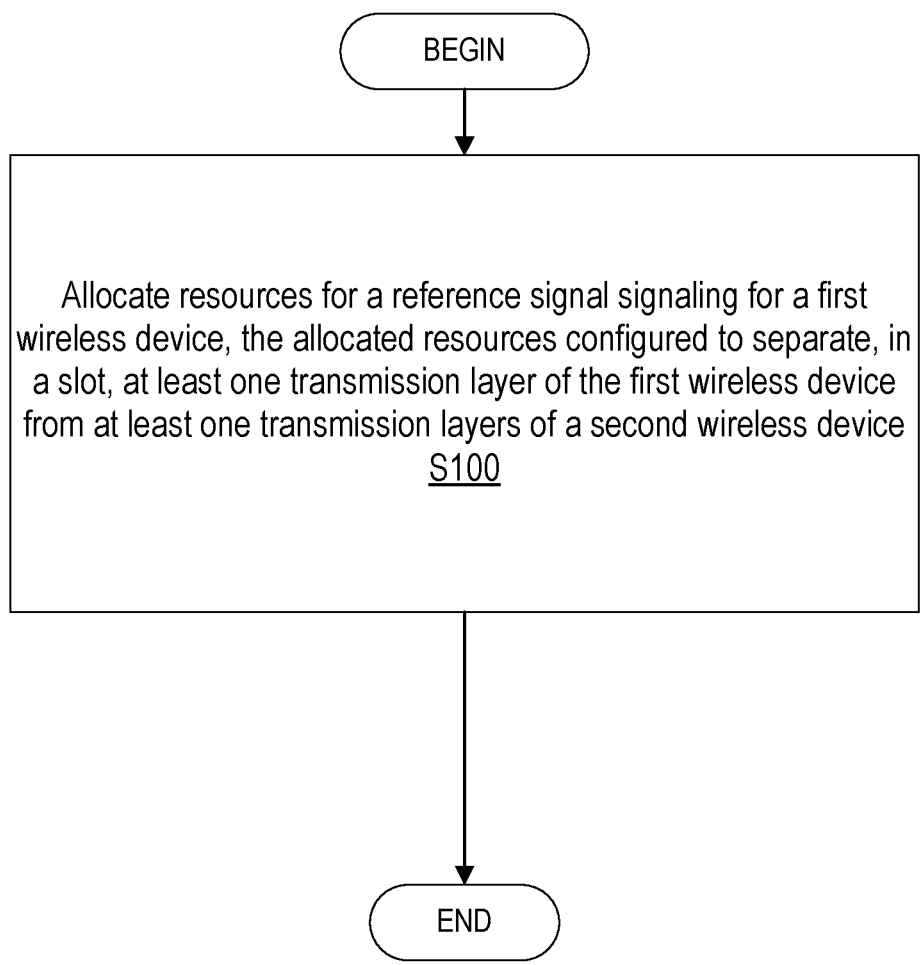
FIG. 7 is a flow diagram of an exemplary process for a network node according to some embodiments of the present disclosure.

FIG. 7 is a flowchart of an exemplary process in a network node 16 according to one or more embodiments of the disclosure. One or more Blocks and/or functions performed by network node 16 may be performed by one or more elements of network node 16 such as by allocation unit 24 in processing circuitry 36, processor 38, radio interface 32, etc. In one or more embodiments, network node 16 such as via one or more of processing circuitry 36, processor 38 and radio interface 32 is configured to allocate (Block S100) resources for a reference signal signaling for a first wireless device where the allocated resources are configured to separate, in a slot, at least one transmission layer of the first wireless device from at least one transmission layer of a second wireless device by at least one of: scheduling the first wireless device and second wireless device different reference signal ports that are separated by using the same resource elements and different code division multiplexing, CDM, codes, the first wireless device and second wireless device having associated scrambling sequences, scheduling the first wireless device and second wireless device at least one shared reference signal port using the same resource elements and CDM code, the first wireless device and second wireless device having different scrambling sequences, scheduling the first wireless device and second wireless device on different reference signal ports that are separated by frequency division multiplexing, FDM, by using different resource elements and the same CDM codes, the first and second wireless device having associated scrambling sequences, and scheduling the first wireless device and second wireless device on different reference signal ports that are separated through both FDM and CDM by using different resource elements and different CDM codes, the first wireless device and second wireless device having associated scrambling sequences.

In one or more embodiments, the first wireless device and the second wireless device having the at least one shared reference signal port are part of a wireless device sub-group, the wireless device sub-group meeting at least one predefined spatial condition. In one or more embodiments, the allocated resources provide for Multi-User, MU-Multiple-Input Multiple-Output, MIMO, transmission. In one or more embodiments, the reference signal ports are separated by frequency division multiplexing. In one or more embodiments, the number of scheduling reference signal ports correspond to the rank of the transmission of the first wireless device.

In one or more embodiments, the processing circuitry is further configured to determine a number of physical resource blocks, PRBs, allocated to the first wireless device, the scheduling of the at least one shared reference port to the first wireless device and second wireless device being based on the determined number of PRBs. In one or more embodiments, the first wireless device is scheduled for a reference signal port combination for a one front-load reference signal symbol configuration. In one or more embodiments, the first wireless device is scheduled for a reference signal port combination for a two front-load reference signal symbol configuration. In one or more embodiments, the processing circuitry is further configured to: allocate resources for reference signal signaling for a plurality of wireless devices, the allocated resources configured to separate, in a slot, at least one transmission layer of each of the plurality of wireless devices from each other, respectively, by at least one of: scheduling at least two wireless devices different reference signal ports, the at least two wireless devices having the same scrambling identifier; and scheduling at least two other wireless devices at least one shared reference signal port, the at least two other wireless devices having different scrambling identifiers. In one or more embodiments, the separation of ports is spatial separation.

Having generally described embodiments and process flow for reference signal configuration and allocation in accordance with the principles of the present disclosure, details relating to the reference signal (e.g., DL DMRS) configuration and allocation to one or more wireless devices 22 will now be described.

Configuration

For DL DMRS configuration, the following RRC parameters may be used:
dmrs-Type. Type 1 may be beneficial for high frequency selective channels while type 2 may be configured if more than 8 MU-MIMO layers may need to be supported.
dmrs-AdditionalPosition. More additional DMRS can give a better channel estimation with large Doppler spread. However, more additional DMRS may result in more overhead.
maxLength. The maximum number of OFDM symbols for DL front loaded DMRS. To support more than 6 MU-MIMO layers, length of 2 may be configured.
scramblingID0 and scramblingID1. The DL DMRS scrambling initialization that are used to initialize the scrambling sequences. In one or more embodiments, the algorithm to determine the two IDs is described below:

In some embodiments, there are 65536 valid values for scrambling IDs. The values may be divided into M groups. All of the groups may or may not have an equal number of values. One group of values may be assigned to a cell, either randomly or based on certain rules. For a given cell, one value from the group is selected and configured as scramblingID0 for all wireless devices 22 in the cell. For a particular wireless device 22 in the cell, one value from the remaining IDs (without the selected ID for scramblingID0) may be selected and configured as scramblingID1 for the wireless device 22. The selection can be random or based on a Round-Robin pattern. In other embodiments, two distinct values are selected randomly from a group and are configured as scramblingID0 and scramblingID1 for a wireless device 22.

Allocation

For DL DMRS allocation, the antenna port field in DCI can dynamically control the DL DMRS allocation. In one or more embodiments, only certain DMRS port combinations may be allowed for 3GPP networks. Those port combinations are referred to as allowed DMRS port combinations.

For SU-MIMO Transmissions:

In one or more embodiments, the configured scramblingID0 may be used. With a wireless device 22 rank, an attempt is made to find the allowed DMRS port combinations that match the rank for the given DMRS configuration. If there are multiple allowed DMRS port combinations that match the rank, there are various options for assigning a port combination. In one or more embodiments, any port combination can be selected for the wireless device 22. In one or more other embodiments, the port combination that has a maximum number of ports separated through FDM is selected. For example, type 1 single-symbol based DMRS is configured for a wireless device 22 and two CDM groups are used for DMRS. If the wireless device 22's rank is 2, there are several allowed port combinations with two ports, such as (0, 1), (2, 3), and (0, 2). Since port 0 and 2 are separated by FDM, this FDM based spatial separation can lead to better channel estimation; therefore, network node 16 selects the port combination (0, 2) for the wireless device 22.

For MU-MIMO Transmissions:

For MU-MIMO transmissions for a group of co-scheduled wireless devices 22, the allocation of scrambling ID and DMRS port may be as follows:

Assumptions: All wireless devices 22 in a cell are configured with the same dmrs-Type, dmrs-AdditionalPosition and maxLength.

Algorithm:

Some 3GPP allowed port combinations may not be considered for MU-MIMO since these allowed port combinations fragment the port space. For example, in cases of type 1, double-symbol based DMRS, port combination (0, 2, 4, 6) (note that these ports may correspond to port 1000, 1002, 1004 and 1006 in 3GPP specifications but to simplify notation the ports are referred to as port 0, 1, 2 and 6, respectively) may not be good and may fragment the port space. If this port combination is assigned to a wireless device 22, no port combination can be found for another wireless device 22 with rank of 2 due to the port space fragmentation. The reduced 3GPP allowed port combinations (i.e., subset of 3GPP allowed port combinations that may not fragment the port space) are referred to herein as MU-MIMO port combinations.

For a given configured dmrs-Type, dmrs-AdditionalPosition and maxLength, let N_FDM denote the max number of DMRS ports that are separated through FDM, and N_MAX denotes the max number of DMRS ports supported for the given configuration. If maxLength is set to 2, N_MAX1 denotes the max number of DMRS ports with single-symbol based DMRS, and N_MAX2 denotes the max number of DMRS ports with double-symbol based DMRS.

Two wireless devices 22 may be considered to be "spatially separated" if one of the following conditions or predefined criterion is/are met:

If the difference between the angle of arrival (AoA) of the two wireless devices 22 is greater than a threshold where the AoA is one example of a spatial metric.

If the orthogonal factor between DL channels of the two wireless devices 22 is smaller than a threshold. Assuming $H_i^n$ is the DL channel vector for i-th receive antenna of wireless device n, and $H_j^m$ is the DL channel vector for j-th receive antenna of wireless device m, the orthogonal factor is defined as $$\frac{\langle H_i^n, H_j^m \rangle}{\|H_i^n\|^2 \|H_j^m\|^2}$$

where $\langle H_i^n, H_h^m \rangle$ represents the inner product of the two channel vectors, and $\|A\|$ is the Euclidean distance of the vector A. Alternatively the orthogonality factor can also be defined as $$\frac{E[\langle H_i^n, H_j^m \rangle]}{E[\|H_i^n\|^2] E[\|H_j^m\|^2]}$$

where E[ ] is the expectation operator. In one or more embodiments, the orthogonal factor is a measure of channel separation of two wireless devices 22 within a subgroup with respect to the network node 16. The DL channel vector or orthogonal factor is an example of a spatial metric.

Both AoA or orthogonal factor can be measured based on the UL reception from the wireless device 22. For example, the channel can be estimated from one of the UL reference signals and further compute AoA or orthogonality factor. For improving the estimation accuracy, the measurements can be filtered over time.

In one or more embodiments, the predefined criterion is associated with a difference of spatial metrics between two wireless devices that is greater than a predefined threshold. In one or more embodiments, the predefined criterion is associated with an absolute value of an inner product of normalized spatial metrics of any two wireless devices 22 that is less than a predefined threshold. A wireless device 22 can be spatially separated from multiple other wireless devices 22.

Assuming that a scheduler, such as a scheduler of the network node 16, has decided to co-schedule N wireless devices 22 for PDSCH transmissions in a TTI (the same frequency/time resources are shared by those wireless devices 22). Those wireless devices 22 are mutually spatially separated. These mutually spatially separated wireless devices 22 may be referred to as a MU-MIMO wireless device group. Among the N wireless devices 22, there are wireless devices 22 that meet a more stringent spatial separation requirement (e.g., such as wireless devices 22 being assigned ports separated by FDM). If two wireless device 22 meet the stringent spatial separation requirement, the two wireless devices 22 are spatially well separated or spatially separated more than just being mutually spatially separated.

In one or more embodiments, scheduling spatially separated wireless devices 22 corresponds to allocating resources configured to separate, in a slot, at least one transmission layer of a first wireless device 22 from at least one transmission layer of a second wireless device 22 by scheduling the first wireless device 22 and second wireless device 22 on different reference signal ports (e.g., DMRS ports) that are separated by using the same resource elements and different CDM codes (e.g., orthogonal codes) where the first wireless device 22 and second wireless device 22 have associated scrambling sequences, as described herein.

In one or more embodiments, scheduling spatially separated wireless devices 22 corresponds to allocating resources configured to separate, in a slot, at least one transmission layer of a first wireless device 22 from at least one transmission layer of a second wireless device 22 by scheduling the first wireless device 22 and second wireless device 22 on at least one shared reference signal port using the same resource elements and CDM code where the first wireless device 22 and second wireless device 22 having different scrambling sequences.

In one or more embodiments, scheduling spatially separated wireless devices 22 corresponds to allocating resources configured to separate, in a slot, at least one transmission layer of a first wireless device 22 from at least one transmission layer of a second wireless device 22 by scheduling the first wireless device 22 and second wireless device 22 on different reference signal ports that are separated by FDM using different resource elements and the same CDM codes where the first wireless device 22 and second wireless device 22 have associated scrambling sequences.

In one or more embodiments, scheduling spatially separated wireless devices 22 corresponds to allocating resources configured to separate, in a slot, at least one transmission layer of a first wireless device 22 from at least one transmission layer of a second wireless device 22 by scheduling the first wireless device 22 and second wireless device 22 on different reference signal ports that are separated through both FDM and CDM by using different resource elements and different CDM codes where the first wireless device 22 and second wireless device 22 having associated scrambling sequence.

Within a MU-MIMO wireless device group, one can form multiple wireless devices 22 sub-groups. The wireless devices 22 in each sub-group are mutually well separated. In one or more embodiments, one wireless device 22 is in multiple sub-groups.

Define the accumulated rank, $R = \sum_{i=1}^{N} R_i$, where $R_i$ is the rank for i-th wireless device 22.

Example Process/Algorithm for Case 1: $N_{MAX1} \geq R$

---

Sort N wireless devices 22 based scheduling priority,
    and set the number of
available DMRS ports, $N_{avail}$, to $N_{MAX1}$
    Limit the MU-MIMO port combinations to those
    with 1 front-load DMRS
symbol
    While $N_{avail} > 0$ and there are un-processed wireless devices 22
        Select the wireless device 22 with the highest scheduling priority
among the un-processed wireless devices 22
        Select a MU-MIMO port combination that contains
        only unassigned
ports and matches wireless device 22's rank, starting from
the highest possible port
number
            If such a port combination cannot be found
                select a MU-MIMO port combination with
                a maximum number
of unassigned ports
                If the difference between wireless device 22's rank and the
number of ports in the port combination is greater than a threshold
                    Do not schedule the wireless device 22
                    Mark the wireless device 22 as dropped
                Else
                    Schedule the wireless device 22 with reduced rank
                    Mark the wireless device 22 as processed
                    Indicate scrambling ID0 in DCI
                End if
            Else
                Schedule the wireless device 22 with its rank
                Mark the wireless device 22 as processed
                Indicate scrambling ID0 in DCI
            End if
        Update $N_{avail}$
End while

---

If there are still unprocessed wireless devices 22 or dropped wireless devices 22, the algorithm can be executed again with $N_{avail}$ being initialized to $N_{MAX2}$. In one or more embodiments, the MU-MIMO port combinations may be limited to those with 2 front-load DMRS symbol.

Example Process/Algorithm for Case 2: $R > N_{MAX1}$:

---

Sort N wireless devices 22 based scheduling priority, and
    set the number of
available DMRS ports, $N_{avail}$, to $N_{MAX2}$
    Limit the MU-MIMO port combinations to those
    with 2 front-load DMRS
symbol
    While $N_{avail} > 0$ and there are un-processed wireless devices 22
        Select the wireless device 22 with the highest scheduling priority
among the un-processed wireless devices 22
        Select a MU-MIMO port combination that contains
        only unassigned
ports and matches wireless device 22's rank, starting from
the highest possible port
number
            If such a port combination cannot be found
                select a MU-MIMO port combination with a maximum
                number
of unassigned ports
                If the difference between wireless device 22's rank and the
number of ports in the port combination is greater than a threshold
                    Do not schedule the wireless device 22
                    Mark the wireless device 22 as DMRS resource not
assigned dropped
                Else
                    Schedule the wireless device 22 with reduced rank
                    Mark the wireless device 22 as processed
                    Indicate scrambling ID0 in DCI
                End if
            Else
                Schedule the wireless device 22 with it rank
                Mark the wireless device 22 as processed
                Indicate scrambling ID0 in DCI
            End if
        Update $N_{avail}$
End while

---

While there are un-processed wireless devices 22 or wireless devices 22 that do not have a DMRS resource assigned
  Select the wireless device 22 with the highest scheduling priority among the un-processed wireless devices 22
  Identify the wireless devices 22 that are not in any wireless device 22 sub-groups that contains this wireless device 22
  Generate a list of ports that are not assigned to wireless device 22 identified above (the same list can be generated as the ports assigned to all other wireless devices 22 that are in any sub-group containing this wireless device 22 plus the ports that are not assigned to any wireless device 22)
  If a port identified in the previous step are already shared by a certain number of wireless devices 22, remove the port from the list. The final list contains all ports this wireless device 22 can share with other wireless devices 22 when different scrambling sequences are used
  Among the ports obtained in the previous step, identify all MU-MIMO port combinations for which the difference between the wireless device 22's rank and the number of ports for the MU-MIMO port combination is not greater than a threshold
  Sort the MU-MIMO port combinations based on the difference between the wireless device 22's rank and the number of ports for the MU-MIMO port combination. The first MU-MIMO port combination has the least difference
  For each port combination
  If, according to one of the configured scrambling ID, the scrambling sequence of the selected wireless device 22 for any port within the port combination is different from the scrambling sequence of any other wireless device 22 that uses the same port

```
        Use the configured scrambling ID in DCI for the wireless
device 22
        Select the port combination for the wireless device 22
        End the for loop
    End if
End for
Mark the wireless device 22 as processed
End while
```

Figure 8:
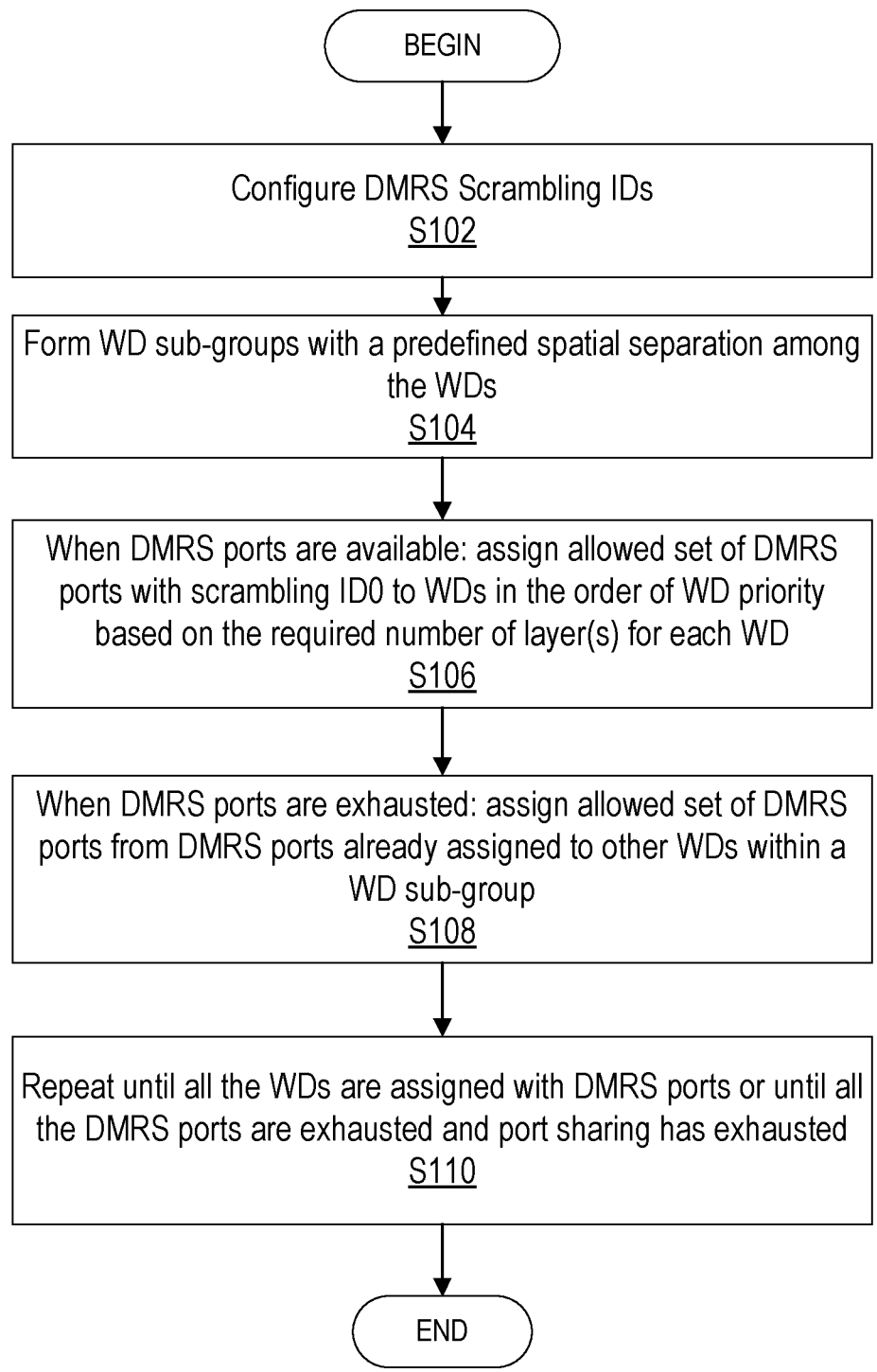
FIG. 8 is a flow diagram of another exemplary process for a network node according to some embodiments of the present disclosure.

FIG. 8 is a flowchart of an exemplary process for allocating DMRS ports according to some embodiments of the disclosure. One or more Blocks and/or functions performed by network node 16 may be performed by one or more elements of network node 16 such as by allocation unit 24 in processing circuitry 36, processor 38, radio interface 32, etc. In one or more embodiments, network node 16 such as via one or more of processing circuitry 36, processor 38 and radio interface 32 is configured to configure (Block S102) DMRS scrambling IDs for one or more wireless devices 22, as described herein. In one or more embodiments, network node 16 such as via one or more of processing circuitry 36, processor 38 and radio interface 32 is configured to form (Block S104) wireless device 22 sub-groups with a predefined spatial separation among the wireless devices 22, as described herein. In one or more embodiments, network node 16 such as via one or more of processing circuitry 36, processor 38 and radio interface 32 is configured to, when DMRS ports (i.e., type of reference signal port) are available, assign (Block S106) an allowed set of DMRS ports with scrambling ID-0 to wireless devices 22 in the order of wireless device 22 priority based on the required number of layer(s) for each wireless device 22, as described herein.

In one or more embodiments, network node 16 such as via one or more of processing circuitry 36, processor 38 and radio interface 32 is configured to, when DMRS ports are exhausted, assign (Block S108) an allowed set of DMRS ports from DMRS ports already assigned to other wireless devices 22 within a wireless device 22 sub-group, as described herein. In one or more embodiments, network node 16 such as via one or more of processing circuitry 36, processor 38 and radio interface 32 is configured to repeat one or more of Blocks S102-S108 (Block S110) until all of the wireless devices 22 are assigned with DMRS ports or until all the DMRS ports are exhausted and port sharing has been exhausted, as described herein.

Figure 9:
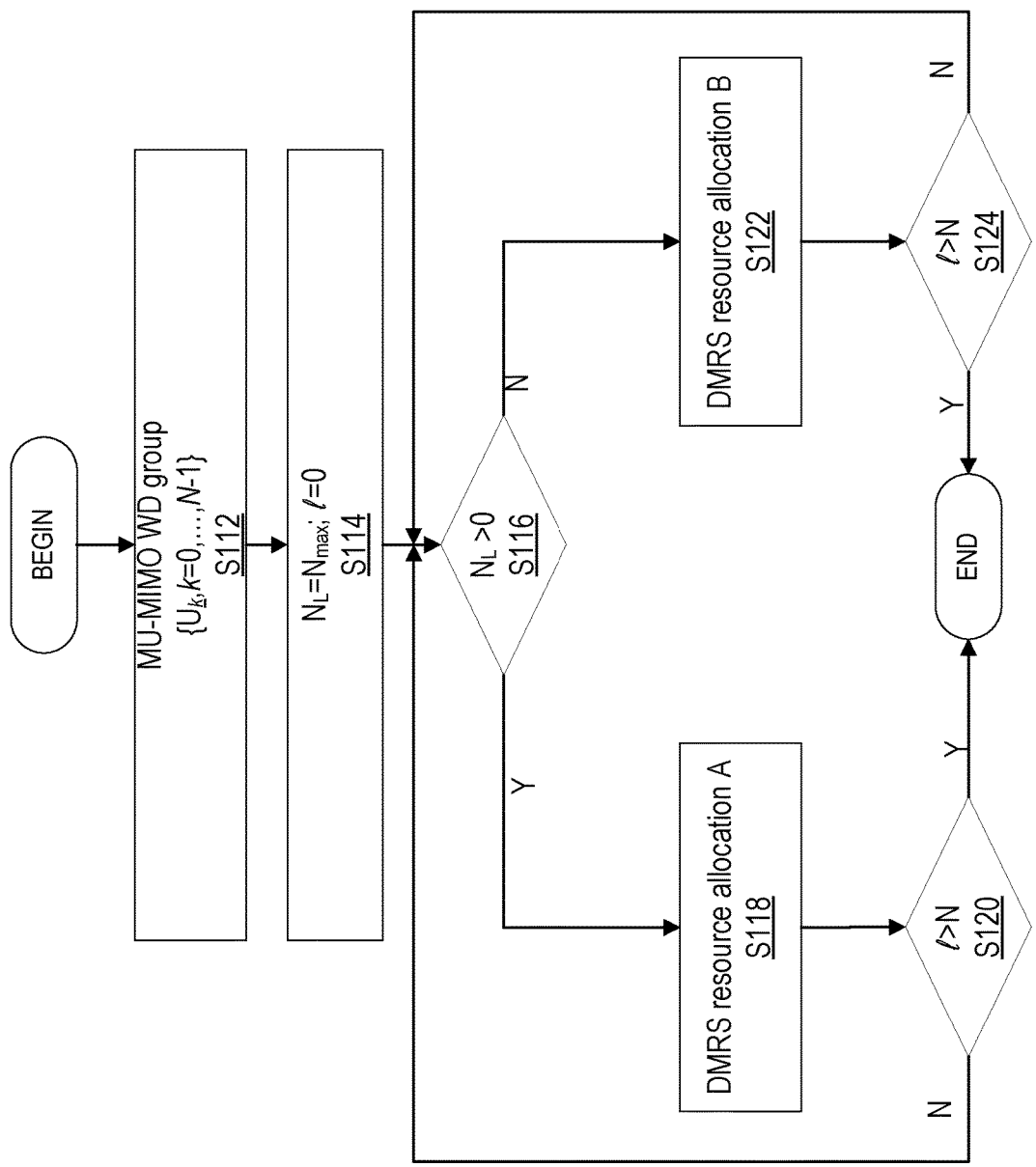
FIG. 9 is a flow diagram of another exemplary process for a network node according to some embodiments of the present disclosure.

FIG. 9 is a flowchart of an exemplary process for allocated DMRS ports as described herein such as with respect to Case 2: $R > N_{MAX1}$. In one or more embodiments, network node 16 such as via one or more of processing circuitry 36, processor 38 and radio interface 32 is configured to determine (Block S112) a MU-MIMO wireless device group $\{U_k, k=0, \ldots, N-1\}$. In one or more embodiments, network node 16 such as via one or more of processing circuitry 36, processor 38 and radio interface 32 is configured to set (Block S114) $N_L = N_{max}$ and $\ell = 0$.

In one or more embodiments, network node 16 such as via one or more of processing circuitry 36, processor 38 and radio interface 32 is configured to determine (Block S116) whether $N_L > 0$. If $N_L > 0$, perform (Block S118) DMRS resource allocation A that is described in detail with respect to FIG. 10. In one or more embodiments, network node 16 such as via one or more of processing circuitry 36, processor 38 and radio interface 32 is configured to determine (Block S120) whether $\ell > N$. If $\ell$ is not greater than N, Block S116 may be performed. If $\ell$ is greater than N, the process may end.

Figure 11:
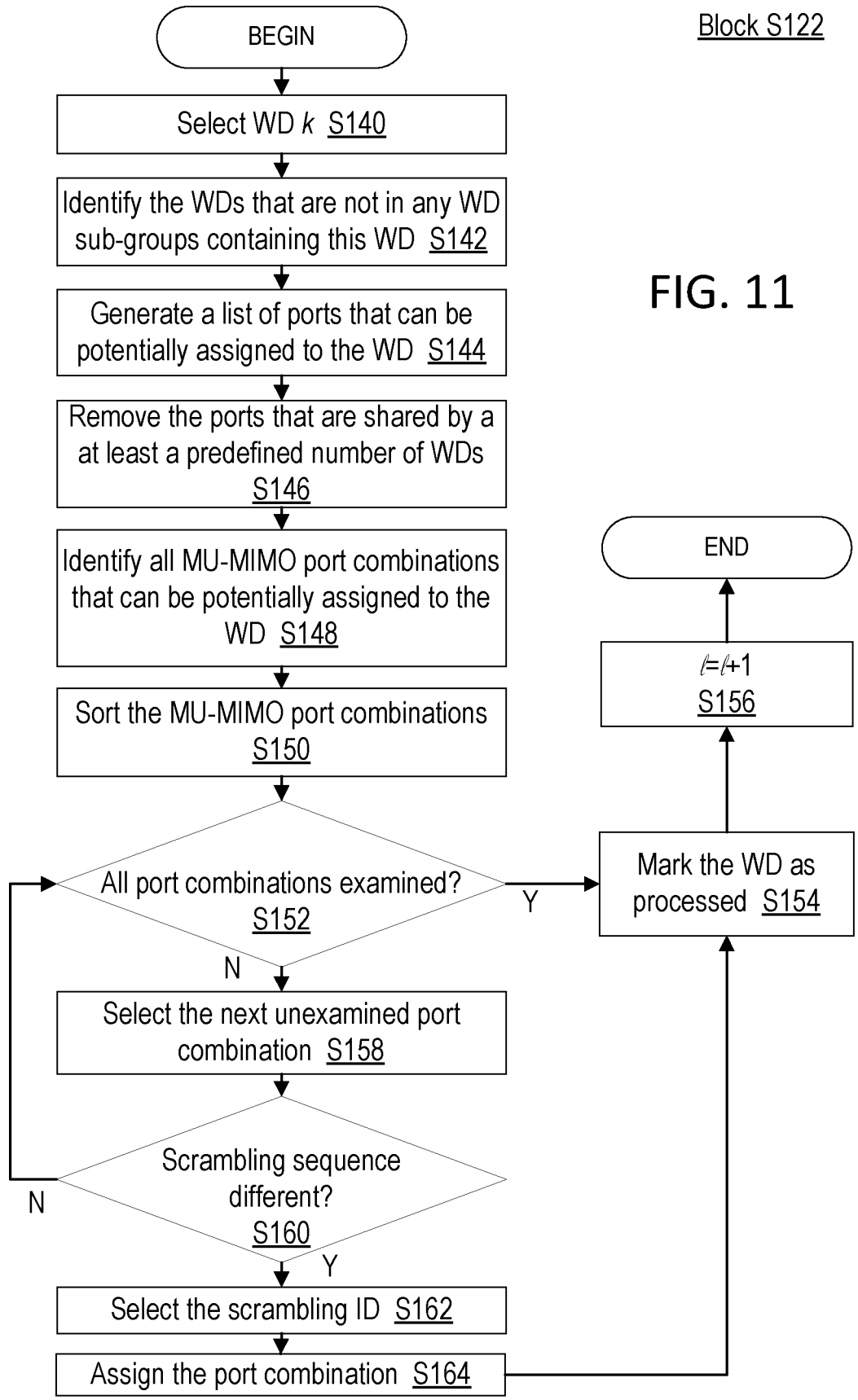
FIG. 11 is a flow diagram of another DMRS resource allocation process according to some embodiments of the present disclosure.

Referring back to Block S116, if $N_L$ is not greater than 0, in one or more embodiments, network node 16 such as via one or more of processing circuitry 36, processor 38 and radio interface 32 is configured to perform (Block S122) DMRS resource allocation B as described with respect to FIG. 11. In one or more embodiments, network node 16 such as via one or more of processing circuitry 36, processor 38 and radio interface 32 is configured to determine (Block S124) whether $\ell > N$. If $\ell$ is not greater than N, Block S116 may be performed. If $\ell$ is greater than N, the process may end.

Figure 10:
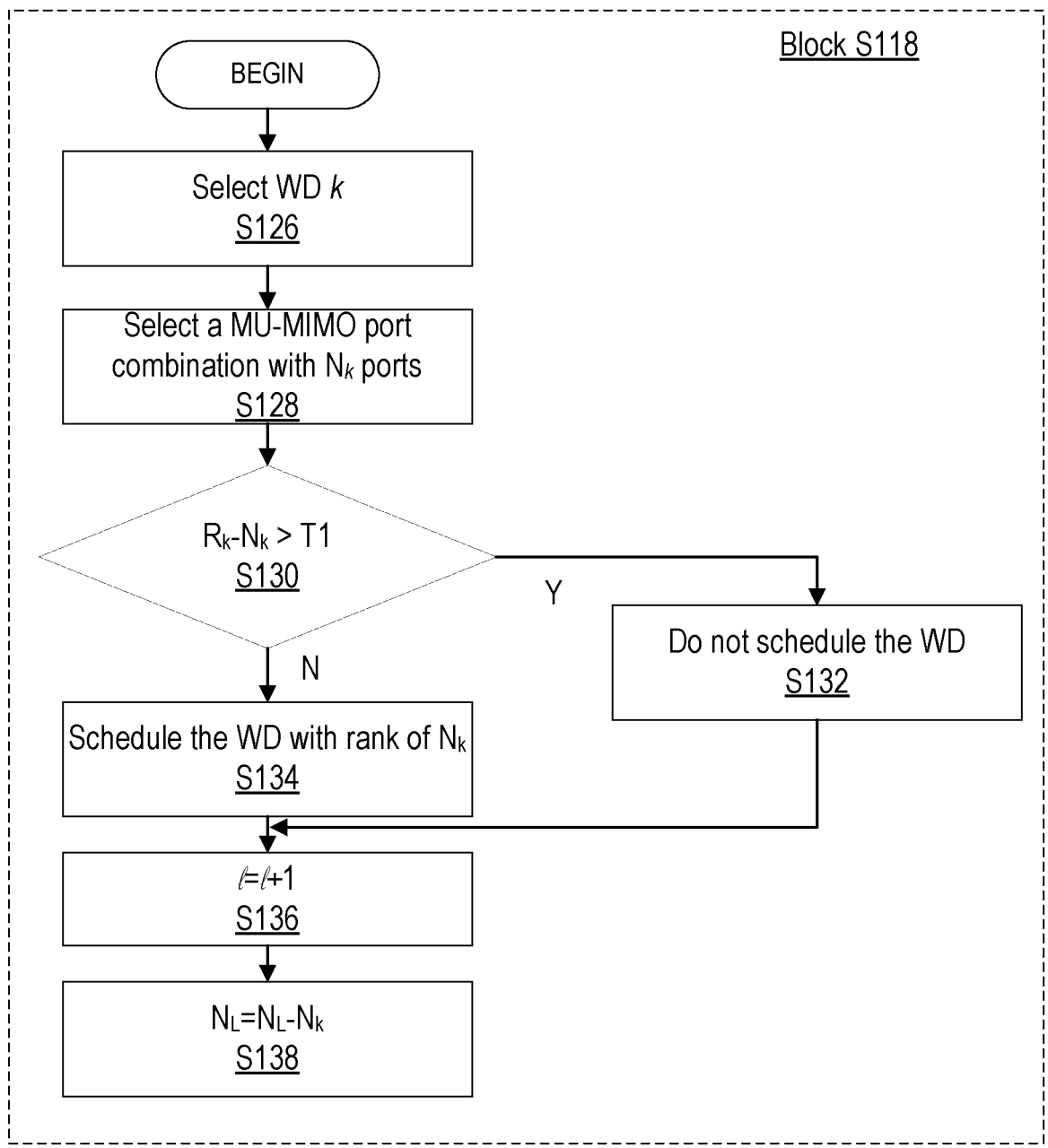
FIG. 10 is a flow diagram of a DMRS resource allocation process according to some embodiments of the present disclosure.

FIG. 10 is a flow diagram of the DMRS resource allocation A process of Block S118 according to some embodiments of the disclosure. In one or more embodiments, network node 16 such as via one or more of processing circuitry 36, processor 38 and radio interface 32 is configured to select (Block S126) wireless device k. In one or more embodiments, network node 16 such as via one or more of processing circuitry 36, processor 38 and radio interface 32 is configured to select (Block S128) a MU-MIMO port combination with $N_k$ ports. In one or more embodiments, network node 16 such as via one or more of processing circuitry 36, processor 38 and radio interface 32 is configured to determine (Block S130) whether $R_k - N_k > T1$. If $R_k - N_k$ is greater than T1, in one or more embodiments, network node 16 such as via one or more of processing circuitry 36, processor 38 and radio interface 32 is configured to not schedule (Block S132) the wireless device k.

If $R_k - N_k$ is not greater than T1, in one or more embodiments, network node 16 such as via one or more of processing circuitry 36, processor 38 and radio interface 32 is configured to schedule (Block S134) the wireless device k with rank of $N_k$. In one or more embodiments, network node 16 such as via one or more of processing circuitry 36, processor 38 and radio interface 32 is configured to set (Block S136) $\ell = \ell + 1$. In one or more embodiments, network node 16 such as via one or more of processing circuitry 36, processor 38 and radio interface 32 is configured to set (Block S138) $N_L = N_L - N_k$.

FIG. 11 is a flow diagram of the DMRS resource allocation B process of Block S122 according to some embodiments of the disclosure. In one or more embodiments, network node 16 such as via one or more of processing circuitry 36, processor 38 and radio interface 32 is configured to select (Block S140) wireless device k. In one or more embodiments, network node 16 such as via one or more of processing circuitry 36, processor 38 and radio interface 32 is configured to identify (Block S142) the wireless devices that are not in any wireless device sub-groups containing the wireless device k. In one or more embodiments, network node 16 such as via one or more of processing circuitry 36, processor 38 and radio interface 32 is configured to generate (Block S144) a list of ports that can be potentially assigned to the wireless device. In one or more embodiments, network node 16 such as via one or more of processing circuitry 36, processor 38 and radio interface 32 is configured to remove (Block S146) the ports that are shared by at least a predefined number of wireless devices.

In one or more embodiments, network node 16 such as via one or more of processing circuitry 36, processor 38 and radio interface 32 is configured to identify (Block S148) all MU-MIMO port combinations that can be potentially assigned to the wireless device. In one or more embodiments, network node 16 such as via one or more of processing circuitry 36, processor 38 and radio interface 32 is configured to sort (Block S150) all of the MU-MIMO port combinations. In one or more embodiments, network node 16 such as via one or more of processing circuitry 36, processor 38 and radio interface 32 is configured to determine (Block S152) whether all port combinations have been examined. If all port combinations, i.e., MU-MIMO port combinations, have been examined, in one or more embodiments, network node 16 such as via one or more of processing circuitry 36, processor 38 and radio interface 32 is configured to mark (Block S154) the wireless device as processed. In one or more embodiments, network node 16 such as via one or more of processing circuitry 36, processor 38 and radio interface 32 is configured to set (Block S156) $\ell = \ell +1$.

If all port combinations have not been examined, in one or more embodiments, network node 16 such as via one or more of processing circuitry 36, processor 38 and radio interface 32 is configured to select (Block S158) the next unexamined port combination. In one or more embodiments, network node 16 such as via one or more of processing circuitry 36, processor 38 and radio interface 32 is configured to determine (Block S160) whether, for a configured scrambling ID, the scrambling sequence for any port within the port combination is different from the scrambling sequence of any other wireless device(s) 22 that use the same port. If the scrambling sequence for any port is not different, Block S152 may be performed. If the scrambling sequences for all ports within the port combination are different for a configured scrambling ID, in one or more embodiments, network node 16 such as via one or more of processing circuitry 36, processor 38 and radio interface 32 is configured to select (Block S162) the scrambling ID. In another embodiment, the scrambling sequences for different wireless devices 22 can be selected such that their correlation is less than a certain or predefined threshold. In one or more embodiments, network node 16 such as via one or more of processing circuitry 36, processor 38 and radio interface 32 is configured to assign (Block S164) a port combination, i.e., MU-MIMO port combination, and move to Block S154.

The example below is one example of the implementation of the algorithm for case 2 at network node 16.

Six wireless devices 22 (WD 22(0) to WD 22(5)) are scheduled for MU-MIMO, or the six wireless devices 22 are in a MU-MIMO WD group. There are only 8 DMRS ports (port 0 to 7) available for the given DMRS configuration.

There are two wireless device sub-groups:
(WD 22(2), WD 22(5))
(WD 22(3), WD 22(4), WD 22(5))

The DMRS resource allocation follows the order of WD priority, from WD 22(0) to WD 22(5).

WD 22(0), WD 22(1), and WD 22(2) all have a rank of 2 and are assigned with ports (6, 7), (4, 5), and (2, 3), respectively.

WD 22(3) has a rank of 1 and is assigned with port 0.

WD 22(4) has a rank of 2, but there is only one port available. WD 22(4) is examined to see if it can share the same ports with other WDs 22. Since WD 22(4) is in only one WD sub-group, which does not contain WD 22(0), WD 22(1) and WD 22(2), the ports that can be used by WD 22(4) are the ports that are not assigned to WD 22(0), WD 22(1) and WD 22(2). In other words, ports 0 and 1 can be used by WD 22(4). Assuming with one of the configured scrambling IDs for WD 22(4), the scrambling sequence for ports 0 and 1 for WD 22(4) is different from the scrambling sequence used by WD 22(3), that ID is used for DCI for WD 22(4) and ports 0 and 1 are assigned to WD 22(4).

WD 22(5) has a rank of 2, and it is also be examined to determine if WD 22(5) can share the same ports with other WDs 22. WD 22(5) is in two WD sub-groups. The WDs 22 that are not included in either WD sub-group are WD 22(0) and WD 22(1). So, the ports that can be used by WD 22(5) are the ports that are not assigned to WD 22(0) and WD 22(1), which are ports 0 to 3.

Figure 12:
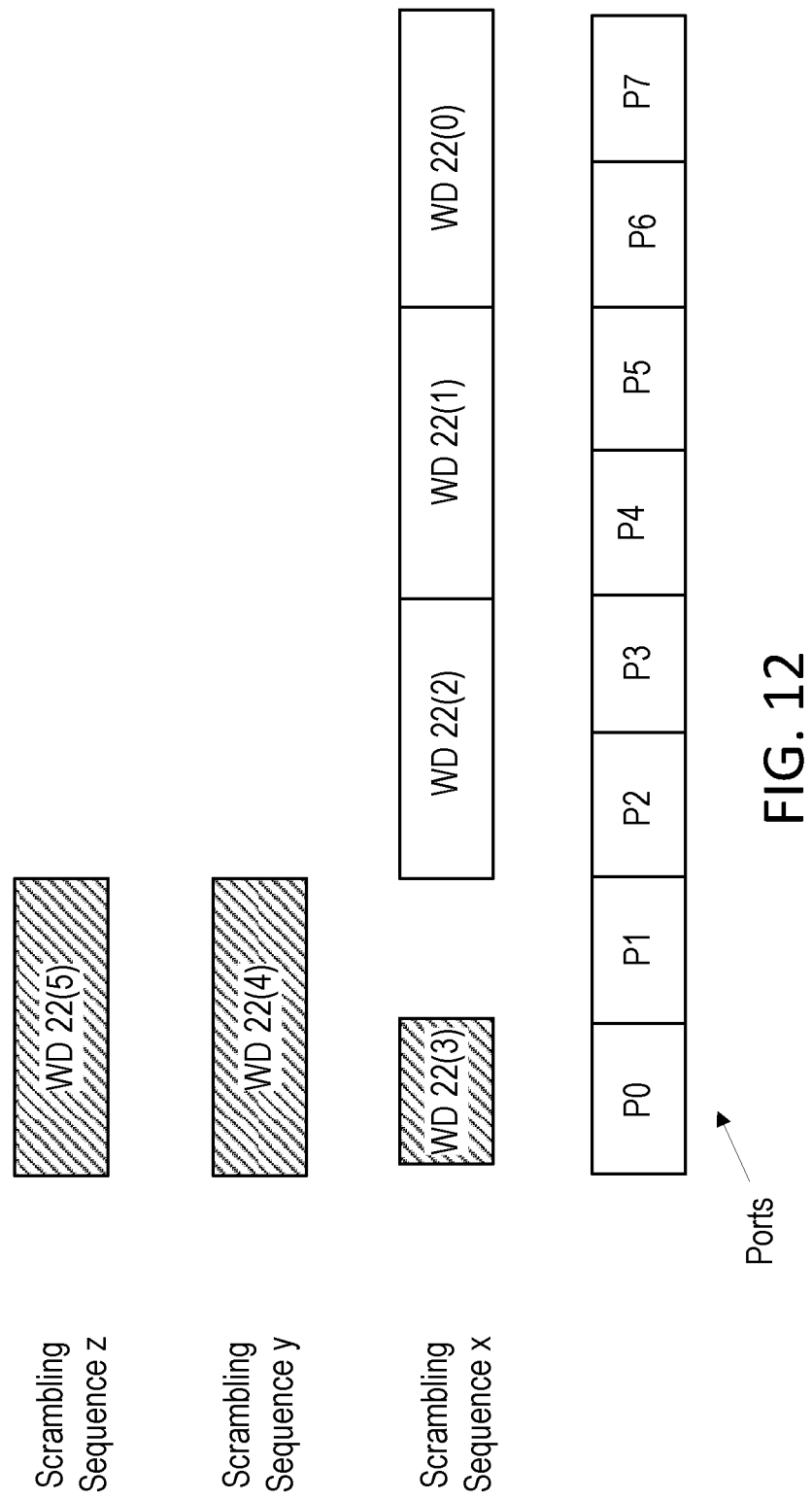
FIG. 12 is a diagram of an example DMRS resource allocation according to some embodiments of the present disclosure.
Figure 13:
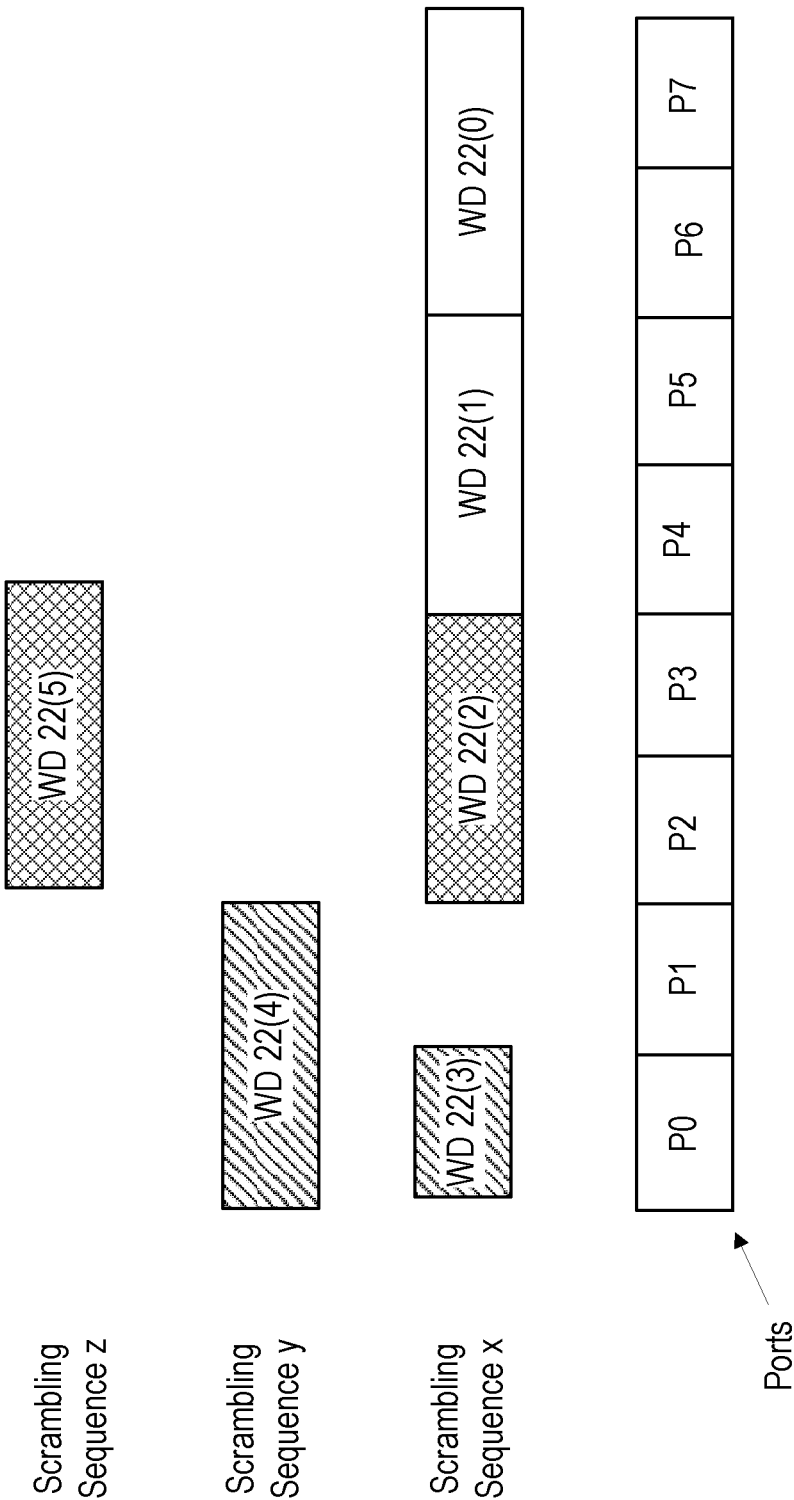
FIG. 13 is a diagram of another example DMRS resource allocation according to some embodiments of the present disclosure.

For rank 2, the MU-MIMO port combinations that can be used for WD 22(5) are (0, 1) and (2, 3). Port combination (0, 1) can be assigned to WD 22(5) if its scrambling sequence is different from the scrambling sequences used by both WD 22(3) and WD 22(4). The final DMRS resource allocation in this case is shown in FIG. 12 where port X is designated as PX. Port combination (2, 3) can be assigned to WD 22(5) if its scrambling sequence is different from the scrambling sequence used by WD 22(2). The final DMRS resource allocation in this case is shown in FIG. 13 where boxes with the same hatching represent common ports shared by one or more WDs 22. In FIG. 13, the scrambling sequence for WD 22(5) is shown to be z (i.e., scrambling sequence z), which is different from the scrambling sequence y used by WD 22(4). However, this is not required. The scrambling sequence for WD 22(5) may only need to be different from that used by WD 22(2). If the maximum number of WDs 22 that share the same DMRS ports is limited to 2, only port combination (2, 3) can be assigned to WD 22(5).

According to an alternative embodiment, the number of PRBs allocated to a WD 22 is used to determine whether the WD 22 can share a DMRS port with other WDs 22. The limit of the number of PRBs to restrict sharing DMRS ports with other WDs 22 can be determined based on the selection of particular scrambling IDs for the WDs 22. With very few PRBs allocated, the DMRS sequences of two WDs 22 with different scrambling IDs can be correlated resulting in a bias in the estimated channel. To protect this bias level, a threshold may be used to restrict the reuse of one or more DMRS ports.

Figure 14:
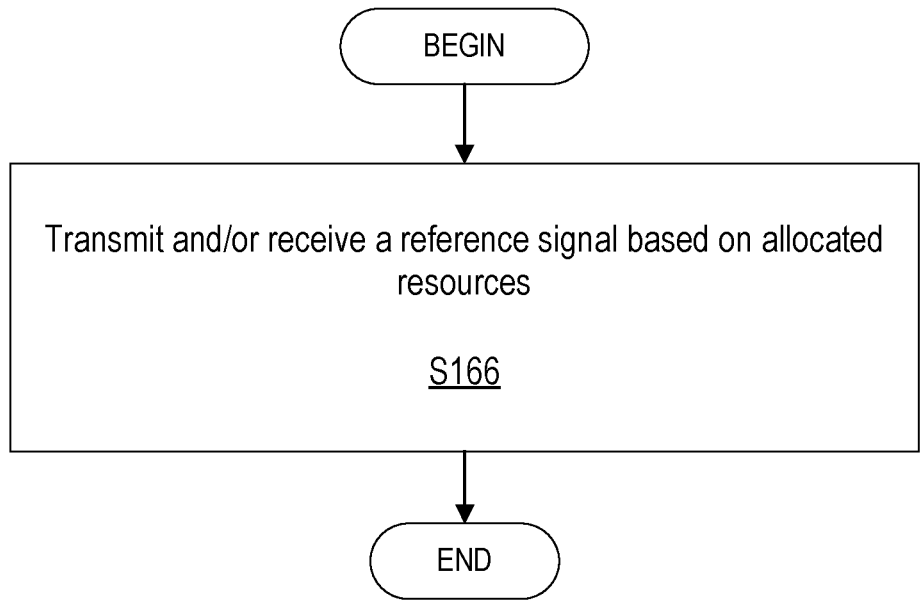
FIG. 14 is a flow diagram of an exemplary process for a wireless device according to some embodiments of the present disclosure.

FIG. 14 is a flow diagram of a process for wireless devices 22 according to some embodiments of the disclosure. In one or more embodiments, wireless device 22 such as via one or more of processing circuitry 46, processor 48 and radio interface 44 is configured to transmit and/or receive (Block S166) a reference signal based on allocated resources that are described herein.

According to one example embodiment, a method in a wireless network that determines resources for DL demodulation reference signal for each wireless device 22 includes:
a. Dividing all scrambling sequences IDs into multiple non-overlapping groups;
b. Allocating a group of scrambling sequences IDs to a set of wireless devices 22, e.g., users in a cell;
c. Selecting one scrambling sequences ID and configuring this as a first scrambling sequences ID for all wireless devices 22 in the set;
d. Selecting one scrambling sequences ID randomly from the remaining (without the one selected in the previous step) and configuring this as a second scrambling sequences ID for a wireless device 22 in the set;
e. Trying to use orthogonal demodulation antenna ports to separate layers and/or wireless devices 22;
f. Allocating the same orthogonal demodulation antenna port to wireless devices 22 with good spatial separation if they can use different scrambling sequences when there are not enough orthogonal demodulation antenna ports available.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node, comprising:
processing circuitry configured to:
    allocate resources for a reference signal signaling for a first wireless device, the allocated resources configured to separate, in a slot, at least one transmission layer of the first wireless device from at least one transmission layers of a second wireless device by:
        scheduling the first wireless device and second wireless device on at least one shared reference signal port using the same resource elements and CDM code, the first wireless device and second wireless device having different scrambling sequences, and the first wireless device and the second wireless device having the at least one shared reference signal port being part of a wireless device sub-group, the wireless device sub-group meeting at least one predefined spatial condition, the at least one predefined spatial condition including a spatial metric associated with each wireless device within the subgroup that meets a predefined criterion with respect to all other wireless devices in the same subgroup;
    the first wireless device scheduled for a reference signal port combination for one selected from a group consisting of:
    a one front-load reference signal symbol configuration; and
    a two front-load reference signal symbol configuration; and
    determine resources for a downlink, DL, demodulation reference signal, DMRS, by:

dividing a plurality of scrambling sequence identifiers, IDs, into a plurality of non-overlapping groups;
allocating a group of scrambling sequence IDs to a set of wireless devices;
selecting one scrambling sequence ID from the plurality of scrambling sequence IDs and configuring the selected one scrambling sequence ID for all wireless devices in the set of wireless devices;
trying to use orthogonal demodulation antenna ports to separate one or both layers or wireless devices in the set of wireless devices; and
allocating a same orthogonal demodulation antenna port to those of the set of wireless devices that have spatial separation above a first threshold if those of the set of wireless devices can use different scrambling sequences when a number of available orthogonal demodulation antenna ports is below a target number.

2. The network node of claim 1, wherein the spatial metric is a measure of an angle of arrival, AoA, between a wireless device and a plane of an antenna array of the network node.

3. The network node of claim 1, wherein the spatial metric is a measure of a spatial channel of a wireless device within a subgroup with respect to the network node.

4. The network node of claim 1, wherein the predefined criterion is associated with a difference of spatial metrics between two wireless devices that is greater than a predefined threshold.

5. The network node of claim 1, wherein the predefined criterion is associated with an absolute value of an inner product of the normalized spatial metrics of any two wireless devices that is less than a predefined threshold.

6. The network node of claim 1, wherein the allocated resources provide for multi-user multiple-input multiple-output, MU-MIMO, transmission.

7. The network node of claim 1, wherein the number of reference signal ports corresponds to a rank of the transmission of the first wireless device.

8. The network node of claim 1, wherein the processing circuitry is further configured to determine a number of physical resource blocks, PRBs, allocated to the first wireless device, the scheduling of the at least one shared reference port to the first wireless device and second wireless device being based on the determined number of PRBs.

9. The network node of claim 1, wherein the processing circuitry is further configured to:
allocate resources for reference signal signaling for a plurality of wireless devices including the first wireless device, the allocated resources configured to separate, in a slot, at least one transmission layer of each of the plurality of wireless devices from each other, respectively.

10. A method for a network node, the method comprising:
allocating resources for a reference signal signaling for a first wireless device, the allocated resources configured to separate, in a slot, at least one transmission layer of the first wireless device from at least one transmission layers of a second wireless device by:
scheduling the first wireless device and second wireless device on at least one shared reference signal port using the same resource elements and CDM code, the first wireless device and second wireless device having different scrambling sequences, and the first wireless device and the second wireless device having the at least one shared reference signal port being part of a wireless device sub-group, the wireless device sub-group meeting at least one predefined spatial condition, the at least one predefined spatial condition including a spatial metric associated with each wireless device within the subgroup that meets a predefined criterion with respect to all other wireless devices in the same subgroup; and
the first wireless device scheduled for a reference signal port combination for one selected from a group consisting of:
a one front-load reference signal symbol configuration; and
a two front-load reference signal symbol configuration; and
determining resources for a downlink, DL, demodulation reference signal, DMRS, by:
dividing a plurality of scrambling sequence identifiers, IDs, into a plurality of non-overlapping groups;
allocating a group of scrambling sequence IDs to a set of wireless devices;
selecting one scrambling sequence ID from the plurality of scrambling sequence IDs and configuring the selected one scrambling sequence ID for all wireless devices in the set of wireless devices;
trying to use orthogonal demodulation antenna ports to separate one or both layers or wireless devices in the set of wireless devices; and
allocating a same orthogonal demodulation antenna port to those of the set of wireless devices that have spatial separation above a first threshold if those of the set of wireless devices can use different scrambling sequences when a number of available orthogonal demodulation antenna ports is below a target number.

11. The method of claim 10, wherein the spatial metric is a measure of an angle of arrival, AoA, between a wireless device and a plane of an antenna array of the network node.

12. The method of claim 10, wherein the spatial metric is a measure of a spatial channel of a wireless device within a subgroup with respect to the network node.

13. The method of claim 10, wherein the allocated resources provide for multi-user multiple-input multiple-output, MU-MIMO, transmission.

14. The method of claim 10, wherein the number of reference signal ports corresponds to a rank of the transmission of the first wireless device.

15. The method of claim 10, further comprising determining a number of physical resource blocks, PRBs, allocated to the first wireless device, the scheduling of the at least one shared reference port to the first wireless device and second wireless device being based on the determined number of PRBs.

16. The method of claim 10, further comprising allocating resources for reference signal signaling for a plurality of wireless devices including the first wireless device, the allocated resources configured to separate, in a slot, at least one transmission layer of each of the plurality of wireless devices from each other, respectively.

* * * * *